US010664727B2

(12) United States Patent
Shigenaka et al.

(10) Patent No.: US 10,664,727 B2
(45) Date of Patent: May 26, 2020

(54) IMAGE PATTERN RECOGNITION DEVICE AND RECORDING MEDIUM

(71) Applicant: FUJI XEROX CO., LTD., Tokyo (JP)

(72) Inventors: Ryosuke Shigenaka, Yokohama (JP); Yukihiro Tsuboshita, Yokohama (JP); Noriji Kato, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 211 days.

(21) Appl. No.: 15/386,473

(22) Filed: Dec. 21, 2016

(65) Prior Publication Data
US 2017/0286810 A1    Oct. 5, 2017

(30) Foreign Application Priority Data

Apr. 1, 2016 (JP) .................. 2016-074219

(51) Int. Cl.
  *G06K 9/66* (2006.01)
  *G06K 9/62* (2006.01)
  (Continued)

(52) U.S. Cl.
  CPC .......... *G06K 9/66* (2013.01); *G06K 9/00744* (2013.01); *G06K 9/4628* (2013.01); *G06K 9/628* (2013.01); *G06N 3/04* (2013.01)

(58) Field of Classification Search
  CPC .... G06K 9/66; G06K 9/00744; G06K 9/4628; G06K 9/628; G06N 3/04
  See application file for complete search history.

(56) References Cited

U.S. PATENT DOCUMENTS 7,319,779 B1 *  1/2008  Mummareddy ... G06K 9/00288
                                                        382/118
7,848,566 B2 * 12/2010  Schneiderman ... G06K 9/00241
                                                        382/159
(Continued)

FOREIGN PATENT DOCUMENTS

EP         1345161 A2      9/2003
JP         H10-44824 A     2/1998
                (Continued)

OTHER PUBLICATIONS

Elhoseiny, Mohamed, et al. "Convolutional models for joint object categorization and pose estimation." arXiv preprint arXiv: 1511. 05175 (2015). 15 pages (Year: 2015).*

(Continued)

*Primary Examiner* — Manav Seth
(74) *Attorney, Agent, or Firm* — Oliff PLC

(57) ABSTRACT

An image pattern recognition device includes: a data reception unit that receives data; a supervision reception unit that receives supervision; and an artificial neural network processing unit that performs artificial neural network processing. The artificial neural network processing unit includes a first sub-network including one or more layers that process a main task, a second sub-network including one or more layers that process a sub-task, and a third sub-network including one or more layers that do not belong to any of the first sub-network and the second sub-network. The third sub-network includes a branch processing unit that outputs a value same as an input feature amount to a plurality of layers. The first sub-network includes a coupling processing unit that couples inputs from the plurality of layers and outputs a result.

5 Claims, 14 Drawing Sheets

(51) Int. Cl.
*G06K 9/46* (2006.01)
*G06K 9/00* (2006.01)
*G06N 3/04* (2006.01)

(56) References Cited

U.S. PATENT DOCUMENTS

| | | | | |
|---|---|---|---|---|
| 8,064,688 | B2* | 11/2011 | Schneiderman ... | G06K 9/00241 382/159 |
| 8,103,603 | B2* | 1/2012 | George ................ | G06N 3/08 706/16 |
| 8,582,807 | B2* | 11/2013 | Yang ................. | G06K 9/00248 382/103 |
| 8,913,839 | B2* | 12/2014 | Ricanek, Jr. ....... | G06K 9/00221 382/226 |
| 9,189,679 | B2* | 11/2015 | Yamazaki .......... | G06K 9/00228 |
| 9,286,524 | B1 | 3/2016 | Mei et al. | |
| 9,373,085 | B1* | 6/2016 | George ............... | G06N 5/04 |
| 9,400,925 | B2* | 7/2016 | Bourdev ............. | G06K 9/6292 |
| 9,471,851 | B1* | 10/2016 | Cao .................... | G06F 40/30 |
| 9,684,852 | B2* | 6/2017 | Cao .................... | G06K 9/00677 |
| 9,928,410 | B2* | 3/2018 | Yoo .................... | G06K 9/4628 |
| 10,068,128 | B2* | 9/2018 | Wang .................. | G06K 9/52 |
| 10,311,334 | B1* | 6/2019 | Florez Choque .... | G06K 9/6231 |
| 10,402,632 | B2* | 9/2019 | Bourdev ............. | G06K 9/6292 |
| 2009/0244608 | A1* | 10/2009 | Tsuji .................. | G06K 9/00228 358/1.15 |
| 2009/0299929 | A1* | 12/2009 | Kozma ............... | G06N 3/0454 706/25 |
| 2013/0259307 | A1* | 10/2013 | Torii .................. | G06K 9/00624 382/103 |
| 2015/0139485 | A1* | 5/2015 | Bourdev ............. | G06K 9/6292 382/103 |
| 2015/0347831 | A1 | 12/2015 | Tamatsu et al. | |
| 2015/0363671 | A1 | 12/2015 | Ma et al. | |
| 2015/0381628 | A1* | 12/2015 | Steinberg .............. | H04L 63/10 726/4 |
| 2016/0093343 | A1* | 3/2016 | Ovsiannikov ....... | G06F 12/0802 365/189.02 |
| 2016/0148080 | A1* | 5/2016 | Yoo .................... | G06K 9/4628 382/157 |
| 2016/0275375 | A1* | 9/2016 | Kant ................... | G06K 9/4604 |
| 2017/0068871 | A1* | 3/2017 | Abdulkader ......... | G06K 9/66 |
| 2017/0154209 | A1* | 6/2017 | Nakano .............. | G06K 9/00255 |

FOREIGN PATENT DOCUMENTS

| | | |
|---|---|---|
| JP | 2008-198078 A | 8/2008 |
| JP | 2015-95212 A | 5/2015 |
| JP | 2016-001362 A | 1/2016 |
| JP | 2016-006626 A | 1/2016 |

OTHER PUBLICATIONS

Jul. 14, 2017 European Search Report issued in European Patent Application No. 17155341.5.
Yu Bo et al: "Multi-task Deep Learning for Image Understanding," 2014 6th International Conference of Soft Computing and Pattern Recognition (SOCPAR), IEEE, Aug. 11, 2014 (Aug. 11, 2014), pp. 37-42.
Bouzari H et al: "Adaptive Neuro-wavelet System for the Robust Control of Switching Power Supplies," Multitopic Conference, 2008. INMIC 2008. IEEE International, IEEE, Piscataway, NJ, USA, Dec. 23, 2008 (Dec. 23, 2008), pp. 1-6.
You Quanzeng et al: "A picture tells a thousand words—About you! User interest profiling from user generated visual content," Signal Processing, vol. 124, Apr. 17, 2015 (Apr. 17, 2015), pp. 45-53.
Levi Gil et al: "Age and Gender Classification using Convolutional Neural Networks," 2015 IEEE Conference on Computer Vision and Pattern Recognition Workshops (CVPRW), IEEE, Jun. 7, 2015 (Jun. 7, 2015), pp. 34-42.
Xiaojun Ma et al; "Gender Estimation for SNS User Profiling Using Automatic Image Annotation;" International Workshop on Cross-Media Analysis for Social Multimedia; 2014; pp. 1-6.
David G. Lowe; "Object Recognition from Local Scale-Invariant Features;" Proc. of the International Conference on Computer Vision, Corfu; Sep. 1999; pp. 1-8.
Jinjun Wang et al; "Locality-constrained Linear Coding for Image Classification;" CVPR; 2010; pp. 1-8.
David E. Rumelhart et al; "Learning Representations by Back-propagating Errors;" Nature; Oct. 1986; vol. 323; No. 9; pp. 533-536.
Y. LeCun et al; "Backpropagation Applied to Handwritten Zip Code Recognition;" Neural Computation; 1989; pp. 541-551.
Yann LeCun et al; "Gradient-Based Learning Applied to Document Recognition;" Proc. of the IEEE; Nov. 1998; pp. 1-46.
Alex Krizhevsky et al; "ImageNet Classification with Deep Convolutional Neural Networks;" NIPS; 2012; pp. 1-9.
Feb. 21, 2020 Notice of Reasons for Refusal in Japanese Application No. 2016-074219.

* cited by examiner (FIG. 8 CONTINUED)
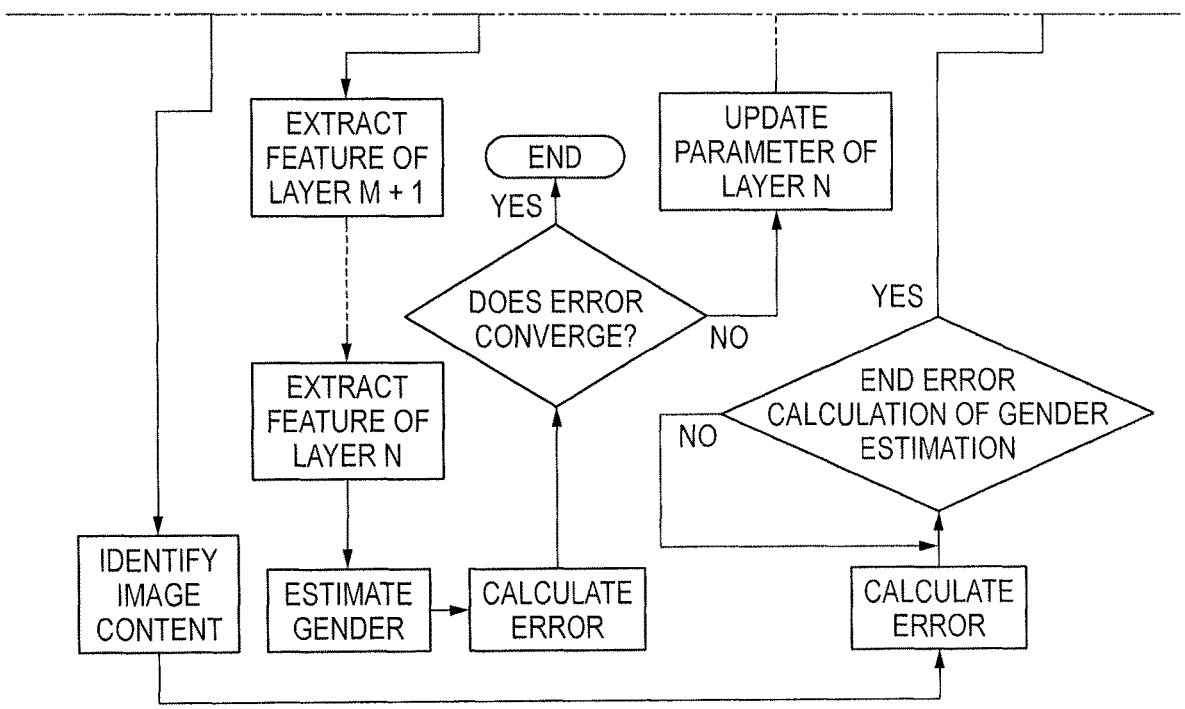

IMAGE PATTERN RECOGNITION DEVICE AND RECORDING MEDIUM

CROSS-REFERENCE TO RELATED APPLICATIONS

This application is based on and claims priority under USC 119 from Japanese Patent Application No. 2016-074219, filed on Apr. 1, 2016.

BACKGROUND

Technical Field

The present invention relates to an image pattern recognition device and a recording medium.

SUMMARY

According to an aspect of the invention, there is provided an image pattern recognition device including: a data reception unit that receives data; a supervision reception unit that receives supervision; and an artificial neural network processing unit that performs artificial neural network processing, wherein the artificial neural network processing unit includes a first sub-network including one or more layers that process a main task, a second sub-network including one or more layers that process a sub-task, and a third sub-network including one or more layers that do not belong to any of the first sub-network and the second sub-network, the third sub-network includes a branch processing unit that outputs a value same as an input feature amount to a plurality of layers, and the first sub-network includes a coupling processing unit that couples inputs from the plurality of layers and outputs a result.

BRIEF DESCRIPTION OF THE DRAWINGS

Exemplary embodiment(s) of the present invention will be described in detail based on the following figures, wherein.

DETAILED DESCRIPTION

[Background]

Figure 1:
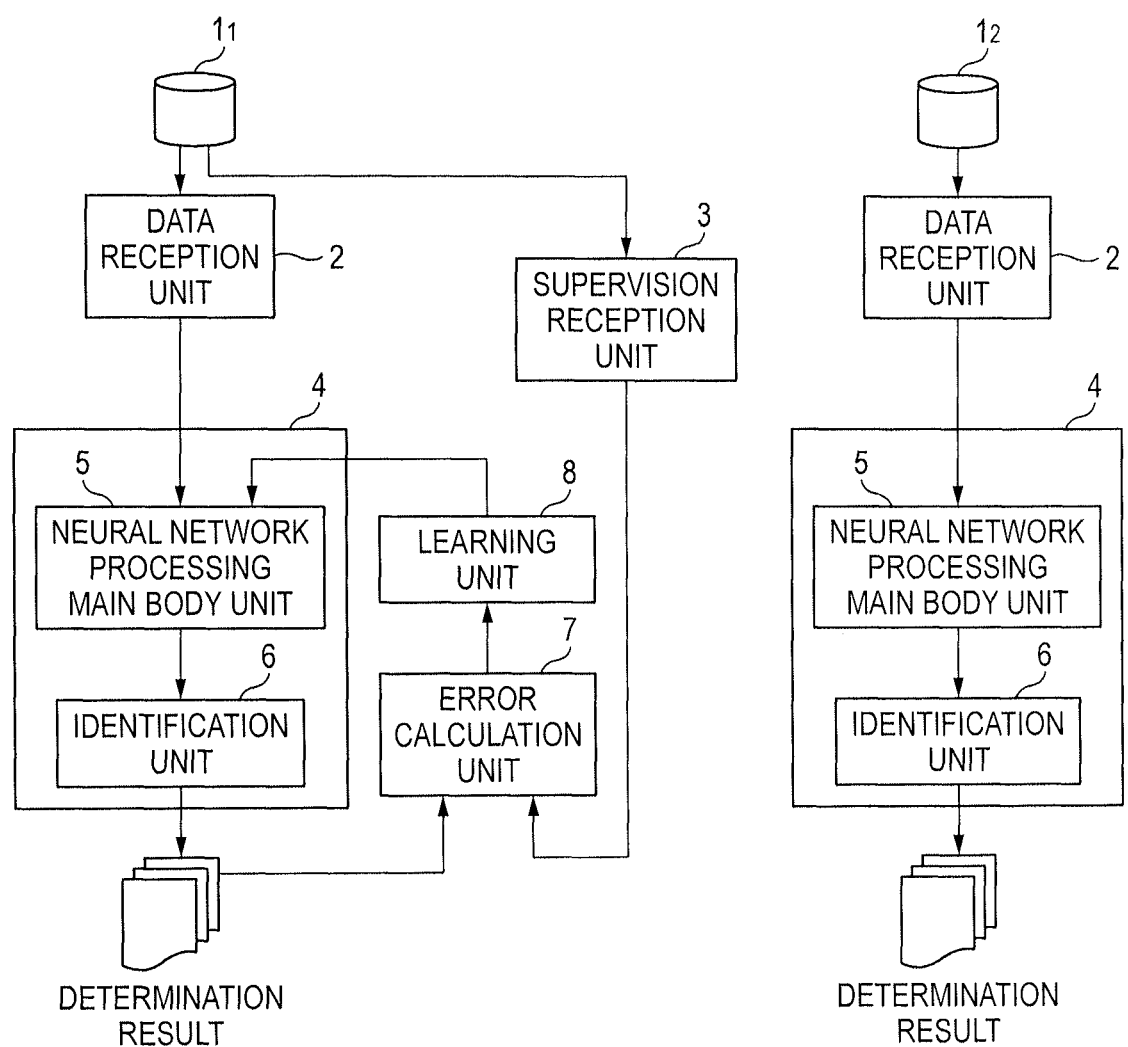
FIG. 1 is a conceptual diagram illustrating an entire configuration of the present exemplary embodiment and a configuration at a time of learning is illustrated in a left diagram and a configuration at a time of determination is illustrated in a right diagram.

In recent years, as a method for a company to perform the market survey, a demand for social media marketing using a social network site (social networking service (SNS)) such as TWITTER or FACEBOOK has been grown.

The social media marketing is a method of surveying the needs of consumers by extracting mass opinions and reviews for products and services posted on the SNS from the content of the user's posting, and thus, the survey can be performed in a real time at a low cost.

However, difficultly from the monitoring survey using questionnaires in the related art, in many cases, demographic profiles such as genders, ages, or occupations of the users are not clear. Therefore, it is not possible to perform a segment analysis in which the reviews are analyzed for each consumer's profile, and as a result, an effective marketing cannot be performed.

In order to solve this problem, a study for estimating the profiles of a user from the text or the image posed on the SNS by the user or the social relationship between the users is performed. For example, in JP-A-2016-001362 and Non-Patent Document 1 described below, a method of estimating the gender of the user who has posted an image from the image posed on the SNS is proposed.

Specifically, thirty categories in which ten types of image content (a pet, foods, a vehicle, entertainers, or the like) and three genders (male, female and gender unknown) are combined are defined, and the gender estimation is realized by classifying the image to the thirty categories.

In the image pattern recognition described above, the processing is often performed in stepwise by dividing the processing into a few tasks due to a difficulty of the problem. For example, in JP-A-10-44824, with respect to a task of determining the opening or closing states of the eyes from a face image, the processing is divided into three tasks such as a detection of eyes position, a detection of the sizes of the eyes, and a determination of opening and closing of the eyes. The determination of opening and closing state of the eyes is positioned in a main task, the detection of the eyes position and the detection of the sizes of the eyes are positioned in a sub-task, and then, processing is performed in stepwise such as an order of "detection of the eyes position" → "detection of the sizes of the eyes" → "determination of opening and closing states of the eyes".

In JP-A-2016-001362 and Non-Patent Document 1 described below, an LLC (a SIFT disclosed in Non-Patent Document 2 described below is encoded: see Non-Patent Document 3 described below) is used, which is a feature representing method designed in advance by a human.

On the other hand, in order to perform the pattern recognition, there is a method in which a feature representation learning which causes a machine to automatically learn the feature amount to be extracted from the image or the representation method thereof is used in image pattern recognition. As a method of performing the feature representation learning, a multilayer neural network (refer to Non-Patent Document 5 described below) using the error back-propagation method (refer to Non-Patent Document 4 described below) is proposed.

In this method, for example, a brightness of an image is input to the multilayer neural network, a result of calculation by a non-linear calculation in each layer is propagated forward, and the output result is obtained in the final layer. Next, the parameter of each layer is updated by back-propagating the error between the output result and supervision from the output layer. By repeating this processing, in the multilayer neural network, it becomes possible to learn the feature representation suitable for the pattern recognition.

In JP-A-2008-198078 and JP-A-2016-006626, the feature representation learning is performed using the artificial neural network while the feature representation learning is not performed in JP-A-2016-001362 and Non-Patent Document 1 described below.

Figure 3:
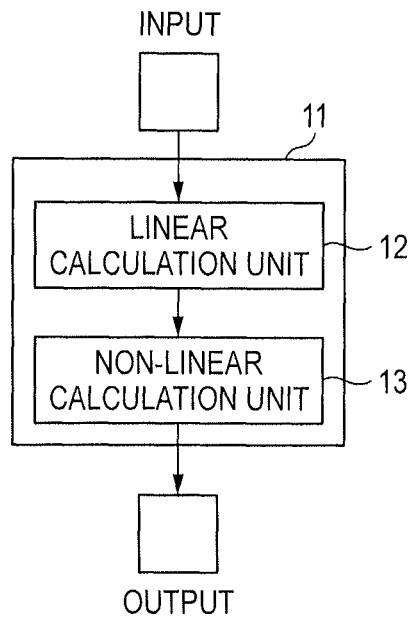
FIG. 3 is a conceptual diagram illustrating a configuration of a total coupling layer.

In JP-A-2008-198078, the determination of the opening and closing of the eyes is set to be the main task and the determination of the presence or absence of the eyes is set to be the sub-task. As illustrated in FIG. 3 of the JP-A-2008-198078, a unit that outputs the determination result of the opening and closing of the eyes and a unit that outputs the determination result of the presence or absence of the eyes are arranged on the output layer in parallel.

In addition, in JP-A-2016-006626, two tasks of a position estimation of a person and a determination of the presence or absence of a person are set, and a unit that performs the position estimation of the person and a unit that performs the determination of the presence or absence of a person are arranged on the output layer in parallel.

[Non-Patent Document 1] X. Ma et al., Gender Estimation for SNS User Profiling Using Automatic Image Annotation, International Workshop on Cross-media Analysis for Social Multimedia, 2014.

[Non-Patent Document 2] D. G. Lowe et al., Object Recognition from Local Scale-Invariant Features, ICCV, 1999.

[Non-Patent Document 3] J. Wang et al., Locally-Constrained Linear Coding for Image Classification, CVPR, 2010.

[Non-Patent Document 4] D. E. Rumelhart et al., Learning Representations by back-propagating errors, Nature, 1986.

[Non-Patent Document 5] Y. LeCun et al., Backpropagation applied to handwritten zip code recognition, Neural Computation, 1989.

[Non-Patent Document 6] Y. LeCun et al., Gradient-Based Learning Applied to Document Recognition, IEEE, 1998.

[Non-Patent Document 7] A. Krizhevsky et al., ImageNet Classification with Deep Convolutional Neural Networks, NIPS, 2012.

Hereinafter, an exemplary embodiment of the present invention will be described in detail. However, the exemplary embodiment described hereinafter presents an example of an image pattern recognition device for embodying the technical idea relating to the present invention, and has no intention to limit the present invention to this exemplary embodiment. The present invention can equally be applied to various changes of the exemplary embodiment without departing from the technical idea described in aspects of the invention.

Exemplary Embodiment

Figure 2:
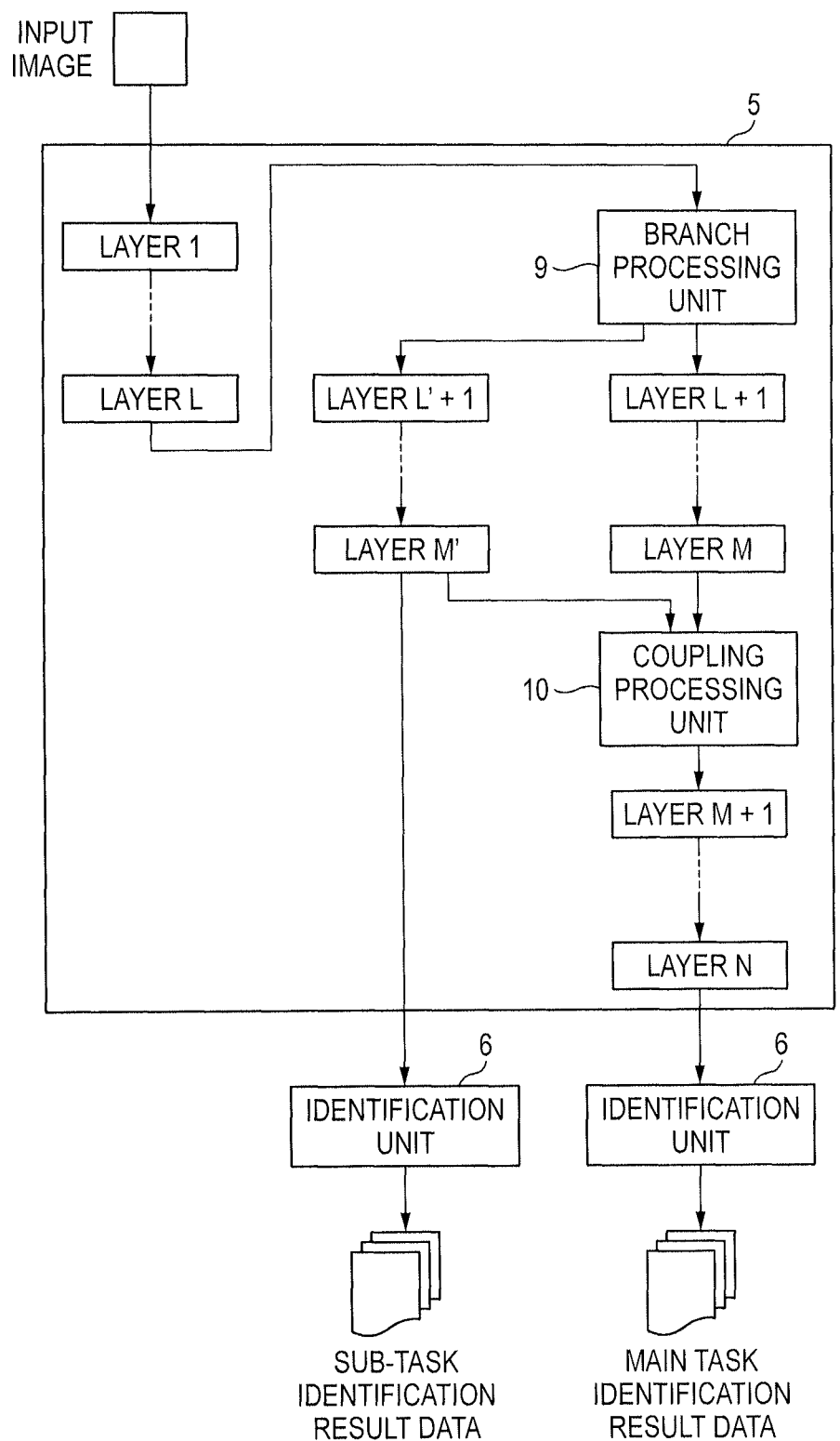
FIG. 2 is a conceptual diagram illustrating an example of a neural network processing unit in the present exemplary embodiment.

A configuration of the present exemplary embodiment is illustrated in FIG. 1 and FIG. 2. Supervised data $1_1$ is configured to include image data and supervision as a pair. The supervised data is required to be constructed in advance in the human effort. Regarding the image, images that are posted on the SNS can be collected by API (such as TWITTER API or INSTAGRAM API). On the other hand, since the supervision cannot be acquired from the API, it is necessary to manually set the supervision for each image.

[Data Reception Unit]

In a data reception unit 2, at the time of learning, an image is read into a memory from data which is stored in a storage such as a hard disk and in which the image and the supervision (supervised label) are set in a pair. In addition, at the time of determination, since the supervised data 1 is not necessary, the image of image data $1_2$ which is a determination target is read into the memory. The input of the image is uniformly performed in any one of the RGB or a grey scale. Processing may be uniformly performed with the size of the image as 224×224, or may be performed as pre-processing of normalization other than above.

[Supervision Reception Unit]

Supervision corresponding to an input image is read into the supervision reception unit 3 from data configured as a pair of the image and the supervision (supervised label).

[Neural Network Processing Unit]

A neural network processing unit 4 is configured to include a neural network processing main body unit 5 and an identification unit 6, and the neural network processing main body unit 5 has a role to extract a feature amount from the image through an artificial neural network. It is configured to have a multilayer and the details of the processing actually performed differ depending on the layer configuration.

[Linear Calculation Unit]

Figure 5:
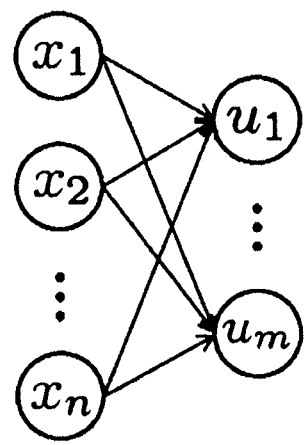
FIG. 5 is a conceptual diagram illustrating processing in the total coupling layer.

A linear calculation unit 12 is used in a total coupling layer 11 in FIG. 3. The total coupling layer 11 has a structure in which the units arrayed in layer shape are coupled only with the adjacent layers, and the information is propagated in one direction from the input side to the output layer side. Each unit that configures the total coupling layer 11 receives plural inputs and calculates one output as illustrated in FIG. 5. If the input is assumed to be $x_1, x_2, x_3 \ldots x_n$, the output of the unit $u_1$ can be calculated as following using a bias term $b_1$.

$$u_1 = w_1 x_1 + w_2 x_2 + \ldots + w_n x_n + b_1 \quad \text{[Formula 1]}$$
$$= \sum_{i=1}^{n} w_i x_i + b_1$$

Therefore, the outputs for all the units can be generalized as following using a matrix.

$$u = Wx + b$$

[Non-linear Calculation Unit]

In a non-linear calculation unit 13, a non-linear function is applied to each unit x of input.

$$u=f(x)$$

For example, a rectified linear unit (ReLU) as described below is used in the non-linear function.

$$f(u)=\max(u,0)$$

[Branch Processing Unit]

Figure 6:
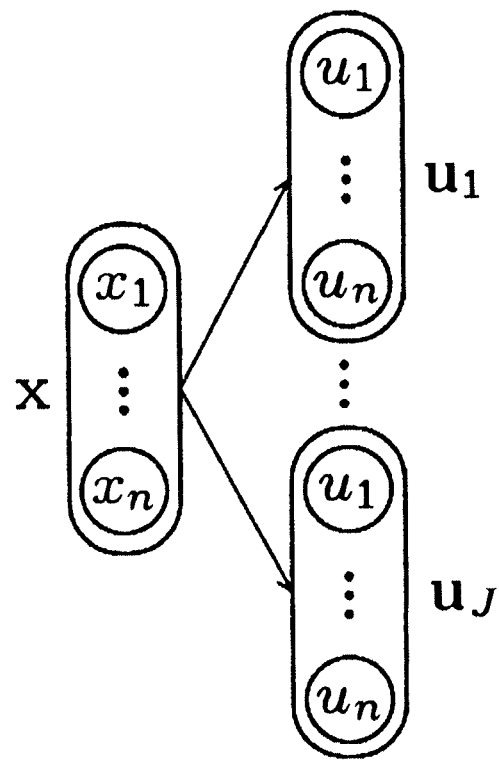
FIG. 6 is a conceptual diagram illustrating a branch processing in a branch processing unit.

A branch processing unit 9 outputs the input value x to plural output destinations without any change. In FIG. 6, $$u_i=u_j=x.$$

[Coupling Processing Unit]

Figure 7:
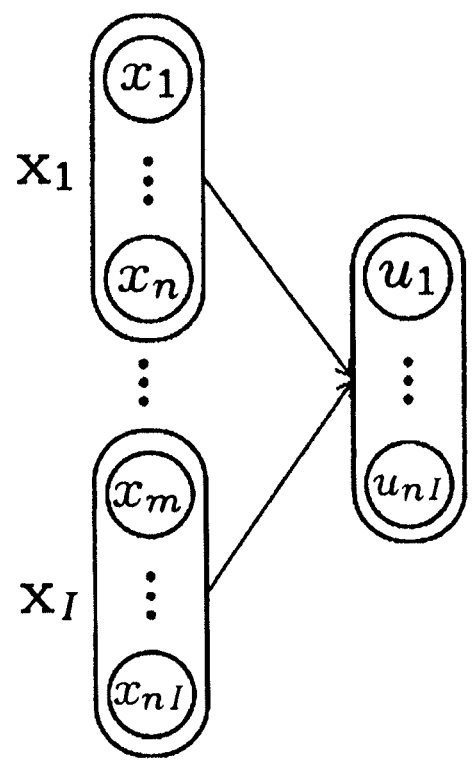
FIG. 7 is a conceptual diagram illustrating coupling processing in a coupling processing unit.

A coupling processing unit 10 receives the outputs from the plural layers and couples the layers and outputs the result. As a coupling method, there is a method performing concatenation processing in which the outputs are received from the plural layers (in FIG. 7, I layers from $x_i$ to $x_j$) and all of those units are concatenated to be output. In FIG. 7, $$m=n(I-1)+1 \text{ and}$$

$$u_j=xi(\text{here},i=1,\ldots,nI).$$

In addition, calculation processing for each element in which the calculation is performed for each element may be performed instead of the concatenation processing. In the concatenation processing, all the input layers are merely concatenated to be output. However, in the calculation processing for each element, integration can appropriately be performed. If it is assumed that the number of units of the input layers is all the same, following calculations are performed for each element. Here, the number of the input layers is two.

$$u=f(x_1,x_2)$$

Examples of the applied functions are described below.
(Product)

$$f(x_1,x_2)=x_i\times x_2$$

(Maximum value)

$$f(x_1,x_2)=\max(x_1,x_2)$$

(Average value)

$$f(x_1,x_2)=(x_1+x_2)/2$$

[Identification Unit]

In an identification unit 6, a following function is applied to each unit x of the input output from the final layers N and M'.

$$u=f(x)$$

A soft max function described below or the like is an example of the applicable functions.

$$y_k = \frac{\exp(x_k)}{\sum_{j=1}^{K} \exp(x_k)}, \quad (k=1,\ldots,K) \qquad \text{[Formula 2]}$$

K is the number of units of the input and is coincident with the number of categories to be identified (for example, in a case of the gender estimation, K=2 for male and female).

[Error Calculation Unit]

An error calculation unit 7 calculates an error from the determination result output from the identification unit and the supervision. For example, a cross entropy can be used in the error calculation. When the supervision with respect to the category k is assumed to be $d_k$, the cross entropy is calculated as follows.

$$E=-\Sigma_k d_k \log yk \qquad \text{[Formula 3]}$$

[Learning Unit]

A learning unit 8 learns weight parameters included in each layer using the error obtained by the error calculation unit. In learning, the error back-propagation method (back-propagation) based on a stochastic gradient descent is used. In the stochastic gradient descent, a parameter w is updated as follows using a gradient $\nabla E_n$ of the error $E_n$ with respect to one or plural number of images.

$$w^{(t+1)}=w^{(t)}-\epsilon\nabla E_n \qquad \text{[Formula 4]}$$

Here, t indicates the number of updates.

In the error back-propagation method, the error is propagated in reverse order from the final layer, and the stochastic gradient descent is performed in each layer. After the update of the parameters of each layer, the error is calculated again, and the update of the parameters is repeated until the error is converged.

[Error Branch Processing Unit]

An error branch processing unit branches the received error and back-propagates the result to the plural layers. Regarding the branching method, processing described below is performed according to the content of the processing in the coupling processing unit 10.

(Concatenation Processing)

When the errors corresponding to $u_1$ to $u_{n1}$ are $e_1$ to $e_{n1}$, the errors as described below are back-propagated to $x_1$ to $x_{n1}$. Here, $y_1$ to $y_{n1}$ correspond to $x_1$ to $x_{n1}$.

$$y_i=e_i(\text{here},i=1,\ldots nI)$$

(Calculation Processing for Each Element: Product)

The value same as the received error is back-propagated to the plural layers.

(Calculation Processing for Each Element: Maximum Value)

The error of each element is back-propagated to the layer from which the maximum value is obtained at the time of the calculation processing for each element without changing the value. The value of zero is back-propagated to other layers.

(Processing of Calculation for each Element: Average Value)

The value which is a result of dividing the received error e by the number of layers at the branch destination is back-propagated. For example, in a case where the number of layers at the branch destination is two, the half value of the error is back-propagated to each layer respectively.

$$y_1=e/2$$

$$y_2=e/2$$

[Error Coupling Processing Unit]

An error coupling processing unit receives the errors from the plural layers and couples the errors to back-propagate. As a coupling method, the weighted sum for all the errors received from the plural layers is output. The weight is provided as a parameter. When y is the output and $x_1$ and $x_2$ are the received errors, the calculation is as follows. Here, the errors are assumed to be received from two layers. $\lambda$ is a weight parameter.

$$y=\lambda x_1+(1-\lambda)x_2$$

Figure 4:
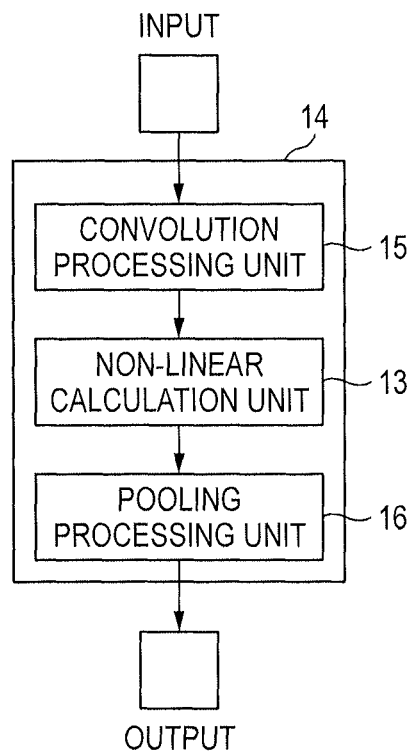
FIG. 4 is a conceptual diagram illustrating a configuration of a convolution layer.

The configuration of the layer in the neural network processing unit 4 is arbitrary, and instead of the total coupling layer 11, a convolution layer 14 (FIG. 4) including a convolution processing layer 15 and a pooling processing unit 16 instead of the linear calculation, may be used. In the total coupling layer 11, all the units between the adjacent layers are totally coupled. However, in the convolution layer 14, only specific units between the adjacent layers are coupled. Therefore, compared to the total coupling layer 11, in a case of using the convolution layer 14 in which the number of units (parameters to be learned) is small, the learning becomes easy.

[Convolution Processing Unit]

In a convolution processing unit 15, in the convolution processing, a filter h composed of H×H parameters is applied to the W×W inputs X. When (i, j)=(i=0, . . . , W−1, j=0, . . . , W−1) and (p, q)=(p=0, H−1, q=0, . . . H−1), a product-sum calculation as follows is performed in the convolution processing.

$$u_{i,j} = \Sigma_{p=0}^{H-1} \Sigma_{q=0}^{H-1} x_{i+p, j+q} h_{p,q}$$ [Formula 5]

In a case where the inputs has plural channels as W×W×K, the convolution processing is performed for each channel, and then, the result is compressed to one channel by taking a maximum value from the output result between the entire channel. In addition, in a case where the channel is plural channels as H×H×C, the convolution processing described above is performed for each channel to be output. Therefore, the output has C channels.

[Pooling Processing Unit]

The pooling processing unit 16 can make the output of the convolution layer 14 not change by slightly decreasing the sensitivity of the position of the feature output from the convolution processing unit even in a case where the position of the target feature amount in the image is slightly changed.

The size of the input is assumed to be W×W×K and a unit area of the pooling processing is assumed to be H×H. In addition, a set of X included in the pooling processing area H×H is assumed to be P. In this case, for example, the pooling processing is performed by a method defined as follows.

(Average Pooling)

$$u_{i,j,k} = \frac{1}{H^2} \sum_{(p,q) \in P} x_{p,q,k}$$ [Formula 6]

(Maximum Pooling)

$$u_{i,j,k} = \max_{(p,q) \in P} x_{p,q,k}$$ [Formula 7]

[Normalization Unit]

In the present invention, a normalization unit may be added, which performs normalization processing before the coupling processing. In the integration of the plural feature amounts by the concatenation processing or the calculation processing for each element, there is a possibility that the integration cannot be appropriately executed in a case where scales of the values of each feature amount are significantly different from each other. Therefore, the normalization unit performs an L1 norm normalization or an L2 norm normalization with respect to each input.

Next, a basic flow of neural network processing will be described.

At the time of determination, the image data is input to the neural network processing unit 4 by the data reception unit 2, and the neural network processing unit 4 outputs the determination result. At the time of learning, the error is calculated by the error calculation unit 7 using the supervision and the determination result acquired from the supervision reception unit 3. Then, the learning of the neural network is executed by the learning unit 8.

The neural network processing unit 4 is configured to include the neural network processing main body unit 5 and the identification unit 6, and the feature amount of an image is extracted by the neural network processing main body unit 5. In FIG. 2, a case of processing total two tasks of one sub-task in addition to a main task is illustrated.

The neural network processing main body unit 5 is configured to include N+M'(1<=L<M<N; M' is the number of the layers of the sub-task), one or more branch processing units 9, one or more coupling processing units 10. The branch processing unit 9 receives the output result of the previous layer (layer L) as an input, and copies and outputs the copies to the layers (in FIG. 2, the layer L'+1 and layer L+1) of the plural branch destinations. The layer 1 to the branch processing unit 9 correspond to a third sub-network in the present invention, the layer L+1 to the layer N correspond to a first sub-network, and the layer L'+1 to the layer M'+1 correspond to a second sub-network.

The coupling processing unit 10 receives the output result of the plural branch sources (in FIG. 2, the layer M' and layer M) as an input, and performs the concatenation processing or the calculation processing for each element on the received output result and outputs the processing result to the layer M+1.

At the time of calculation processing for each element, the calculation for each element (dimension in a vector or a matrix) is performed with respect to the plural input layer, and the result of calculation is output to the layer M+1. This calculation is arbitrary, and thus, a product, a sum, or a maximum value may be considered.

For each layer, the total coupling layer 11 (FIG. 3) configured with the linear calculation unit 12 and the non-linear calculation unit 13, or the convolution layer 14 (FIG. 4) configured with the convolution processing unit 15, the non-linear calculation unit 13, and the pooling processing unit 16, can be used. The neural network using the convolution layer is called a convolution neural network (refer to Non-Patent Document 6 described above), and is known to show a high accuracy in recognizing and identifying the image data. In addition, each of the final layers (layer N and layer M') does not include the non-linear calculation unit and are output to the identification unit from each of the final layers without applying the non-linear calculation. From the final layer (layer M') of the sub-task, the output to the coupling processing unit 10 is also performed in addition to the identification unit 6.

The output from each of the final layer is input to the identification unit 6, and the determination result from the identification unit 6 is output. At the time of learning, this determination result is output to the error calculation unit 7 together with the supervision, and the error between the determination result and the supervision is calculated in the error calculation unit 7.

In the learning unit 8, the error back-propagation method based on a chain rule is executed using the error.

Figure 8:
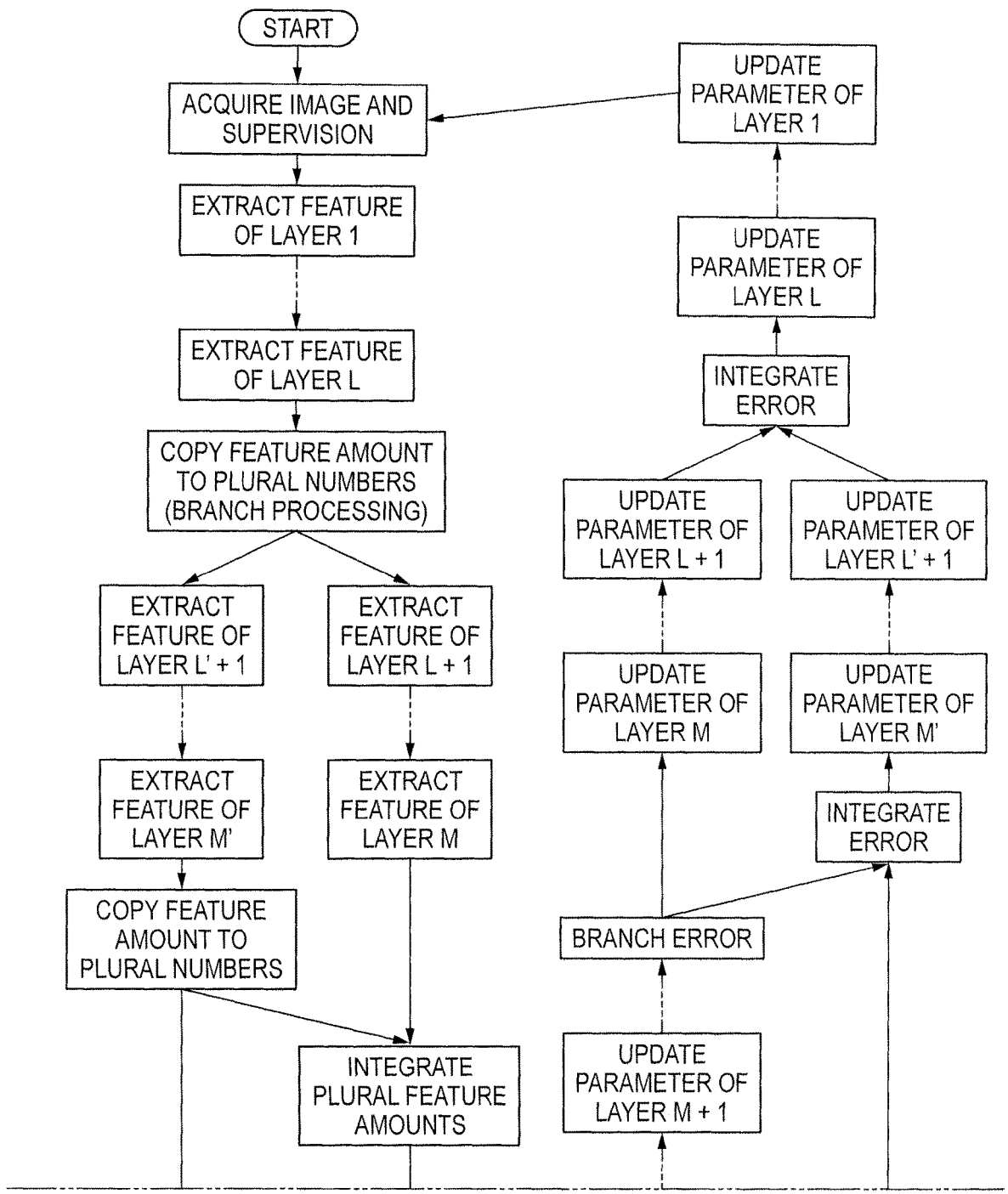
FIG. 8 is a conceptual diagram illustrating an example of a flow of feature representation learning processing, and illustrates a case of performing a recognition of an image content and a gender estimation with the recognition of an image content as a sub-task and the gender estimation as the main task.

In FIG. 8, in a case of estimating the gender of the poster of the image from the image content, a case of performing the recognition of the image content and the gender estimation with the recognition of the image content as the sub-task and with the gender estimation as the main task, is illustrated an example of a flowchart.

When the error back-propagation method is executed, the error is back-propagated from each of the final layers. In each of the layers, the parameter of each layer is updated performing the stochastic gradient descent.

In the process of back-propagation, the error is branched at timing corresponding to the coupling processing of the forward propagation. That is, the error output from the layer M+1 is branched, and then, one is output to the main task side (layer M) and the other is output to the sub-task side (layer M'). In addition, the error is coupled at the timing corresponding to the branch processing of the forward propagation. That is, the error output from the main task side (layer L+1) and the error output from the sub-task side (layer L'+1) are coupled, and the result is output to the layer L.

In the learning unit, as described above, the processing of repeating the update of the parameter of each layer in the neural network is performed until the error of the determination result converges, and the feature representation learning ends at the stage where the error has converged.

Figure 9:
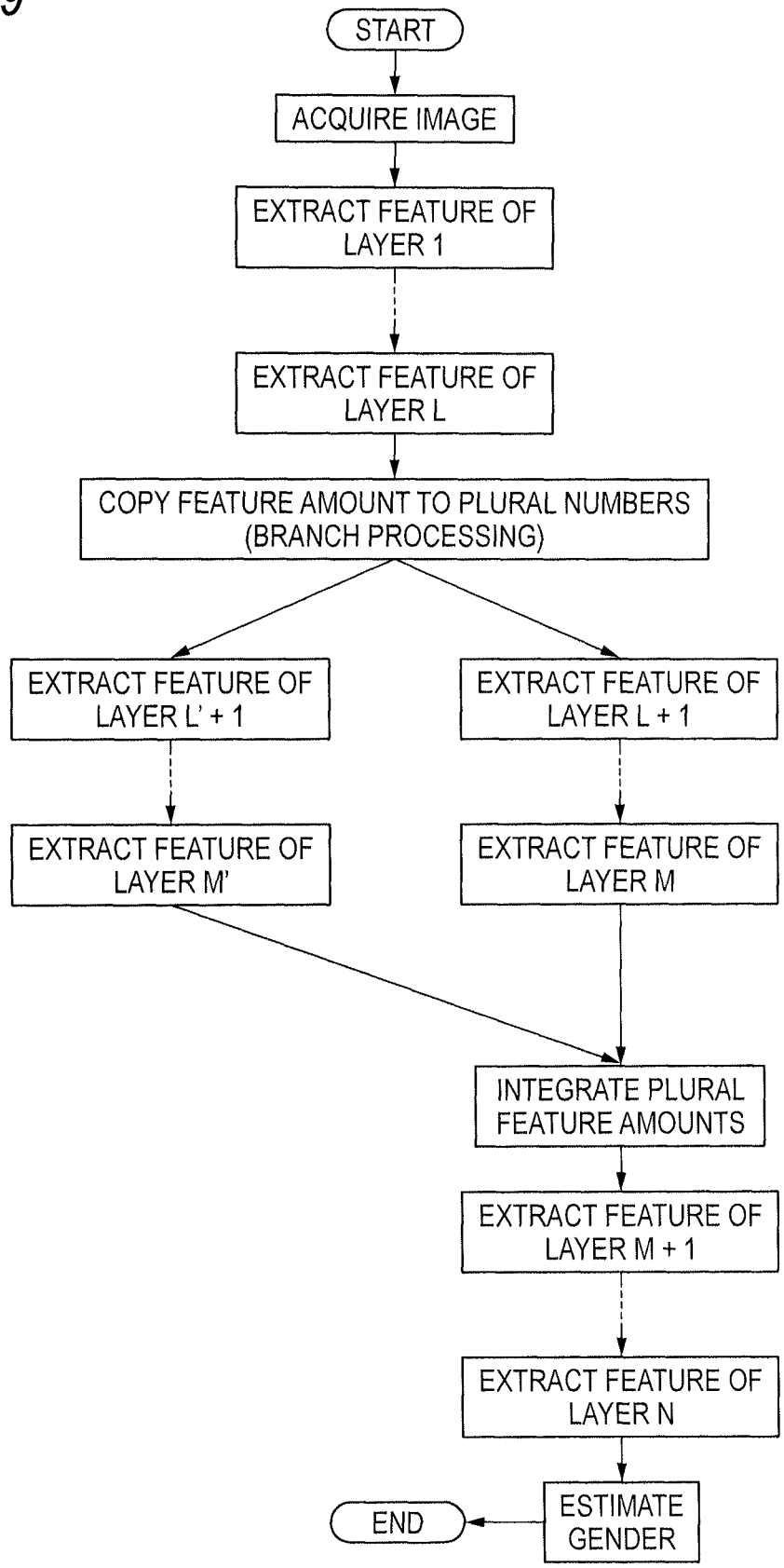
FIG. 9 is a conceptual diagram illustrating an example of a flow in a ease where the gender estimation is performed using a learned neural network.
Figure 10:
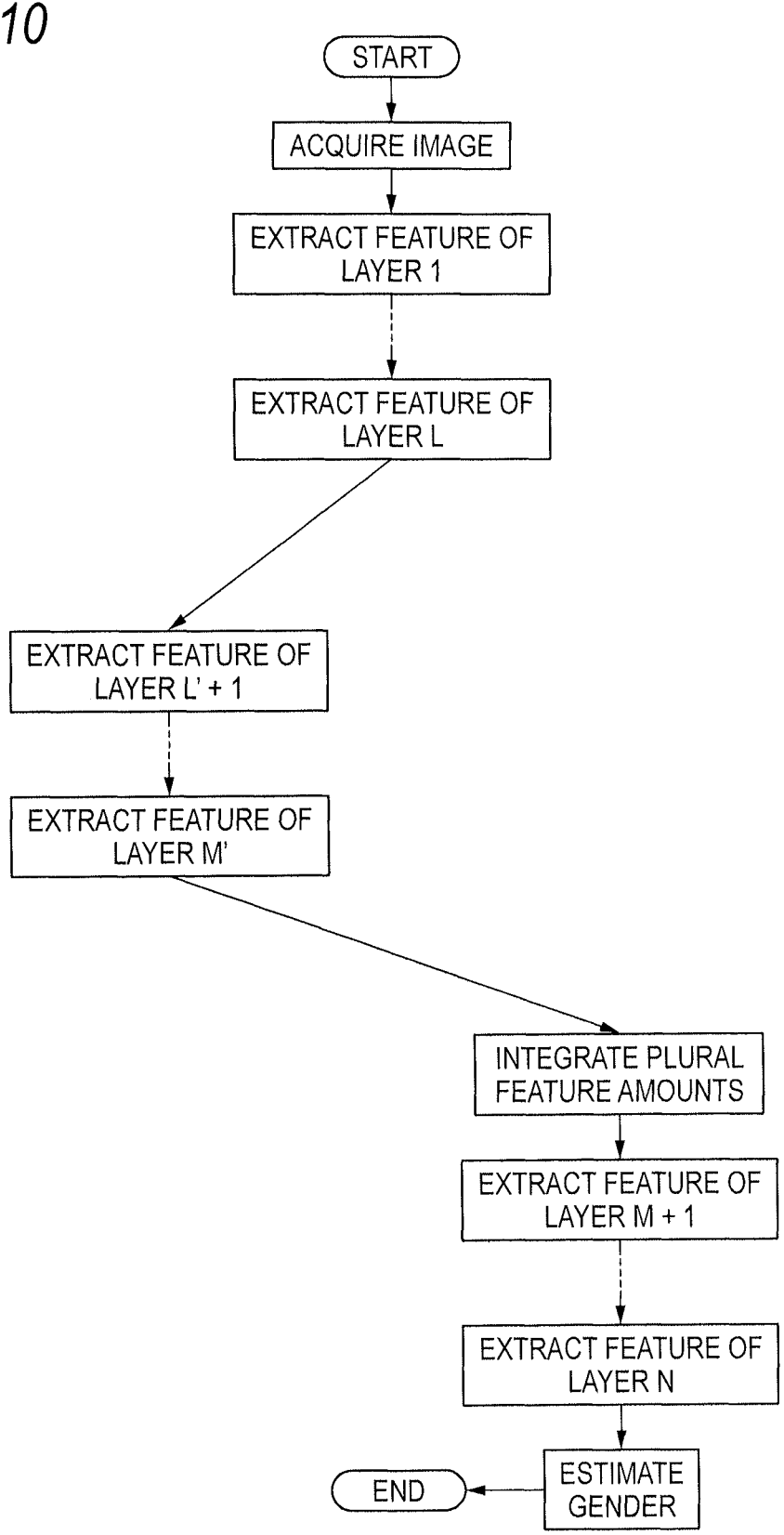
FIG. 10 is a conceptual diagram illustrating an example a flow in a case of performing the gender estimation using the learned neural network.
Figure 11:
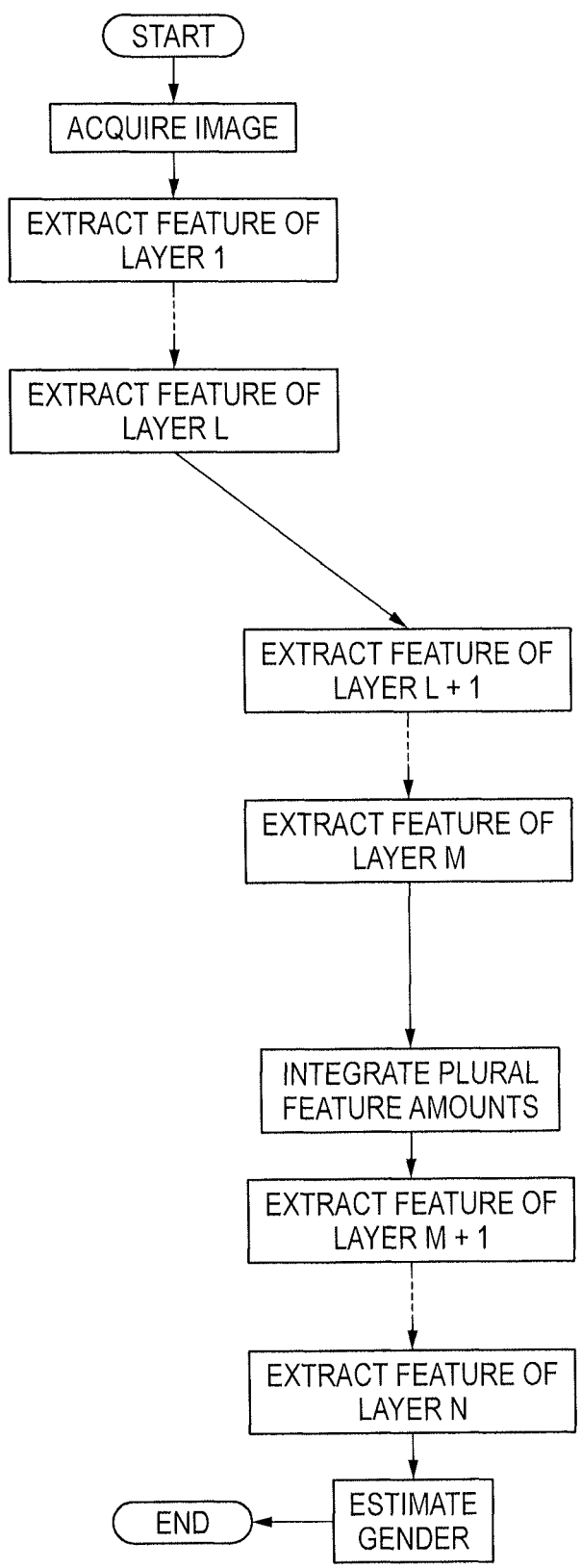
FIG. 11 is a conceptual diagram illustrating an example a flow in a case of performing the gender estimation using the learned neural network.

In FIG. 9 to FIG. 11, an example of a flow chart when the user's gender is actually estimated from the input image using the learned neural network, is illustrated. Due to the learned neural network, the sub-task side is not determined, and the process ends at the time point when the determination result (the result of gender estimation) is output from the identification unit based on the output from the main task side (layer N).

In FIG. 9, a flow is illustrated, in which the output is not performed from the sub-task side (layer M') to the identification unit, and is performed only to the concatenation processing unit 10 or the calculation unit for each element. However, the gender estimation may be performed based on the flows in FIG. 10 or FIG. 11.

EXAMPLE

Next, an Example applied to the gender estimation of a poster (user) from an image posted on the social networking service (SNS) will be described. This Example is applied to the case of performing the recognition of the image content and the gender estimation with the recognition of the image content as the sub-task, and with the gender estimation as the main task.

Figure 12:
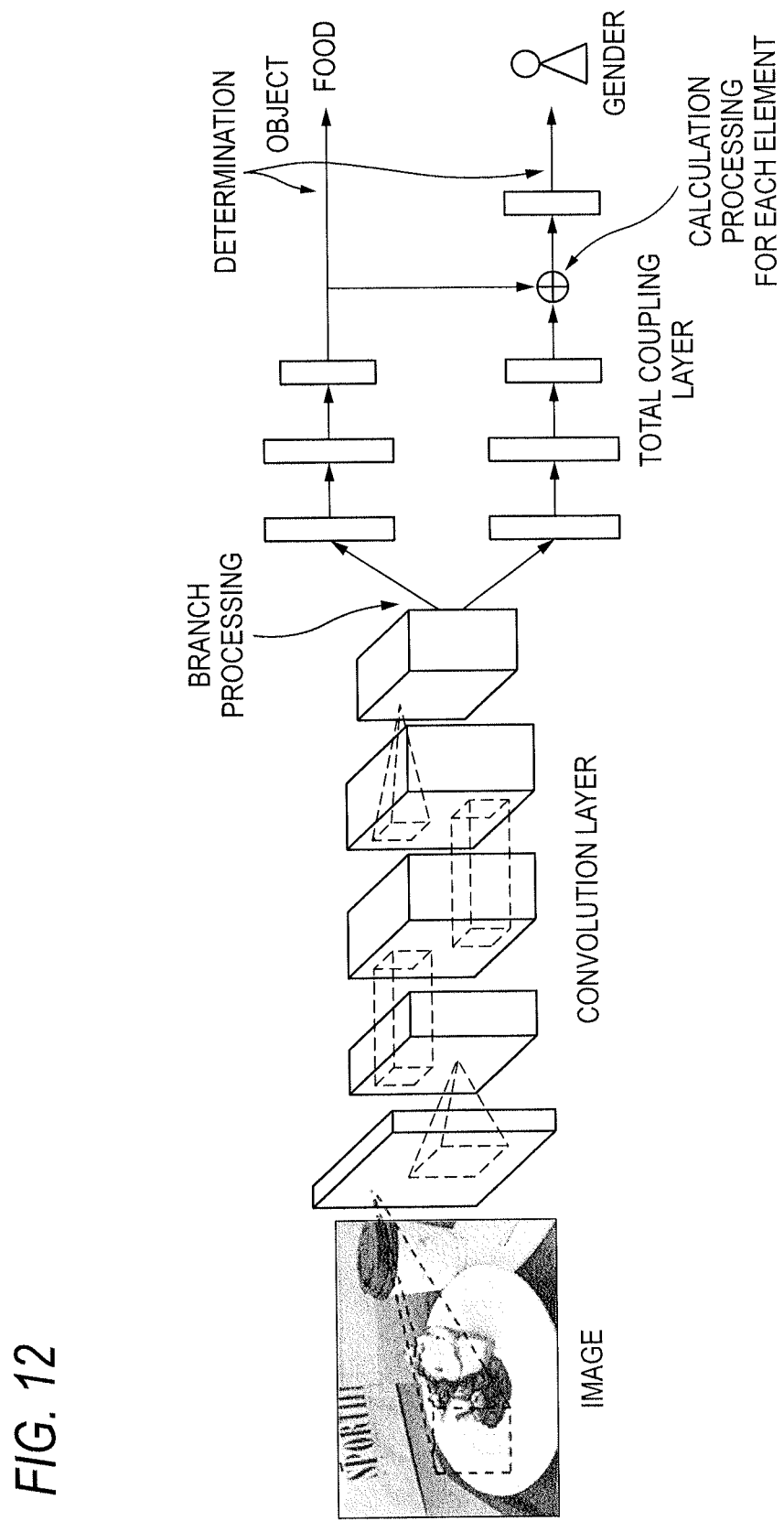
FIG. 12 is a schematic diagram illustrating a configuration of a neural network unit in an Example.

In FIG. 12, a specific configuration of the neural network unit is schematically illustrated. This is based on the network disclosed in Non-Patent Document 7 described above, the branch processing unit is provided after five-layer convolution layers and divided into two branches.

The feature amount of the image content and the feature amount of the gender are coupled by the calculation unit for each element after the three-layer total coupling layers are provided on each branch. Furthermore, the coupled feature amount is output via one-layer total coupling layer. In the present example, the production calculation is used as the calculation unit for each element.

In executing the present Example, with regard to the tweets with an image posted to the TWITTER, images are collected by extracting the tweets from active users posting many tweets except the bots based on the tweets posted from June to August, 2013 in Japan.

Next, the supervised label is created with respect to the user from which equal to or more than 200 tweets or equal to or more than one image can be downloaded. The 26 types of image content labels (IT devices, wild animal, animation, art, books, automobiles and bicycles, cartoon, character, cosmetics products, entertainers, fashion, food, gambling, games, miscellaneous goods, illustrations, buildings, music, ordinary people, pets, plants, posters, landscape, screen shot, sports, and the like) and three types of gender labels (male, female, and gender unknown) are given to the supervised label, and the workers perform the labeling work.

With regard to the image content label, ten workers are asked to vote which image is deemed to be appropriate, and with regard to the gender label, five workers are asked to vote which image is deemed to be appropriate. Then, for each of the image content label and the gender label, final label is determined by the majority of the voting result.

Among the set of the images obtained in this way, a set of 13,525 images is finally obtained from 3,683 users by removing the images to which the gender label is given as gender unknown. Among this, the data set is created with 6,642 images for learning, 1,760 images for parameter design, and 5,123 images for evaluation.

Figure 13:
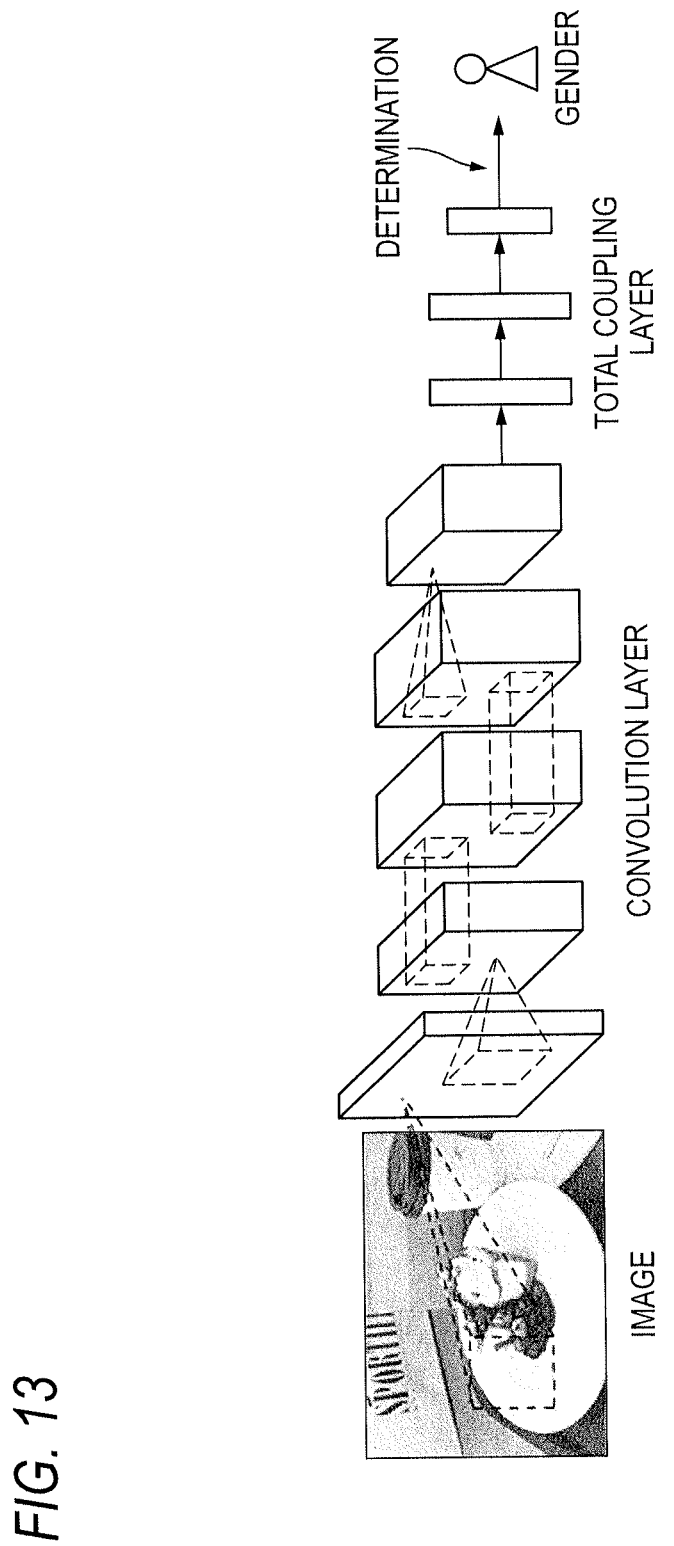
FIG. 13 is a schematic diagram illustrating a configuration of a neural network unit in Comparison Example. 1.
Figure 14:
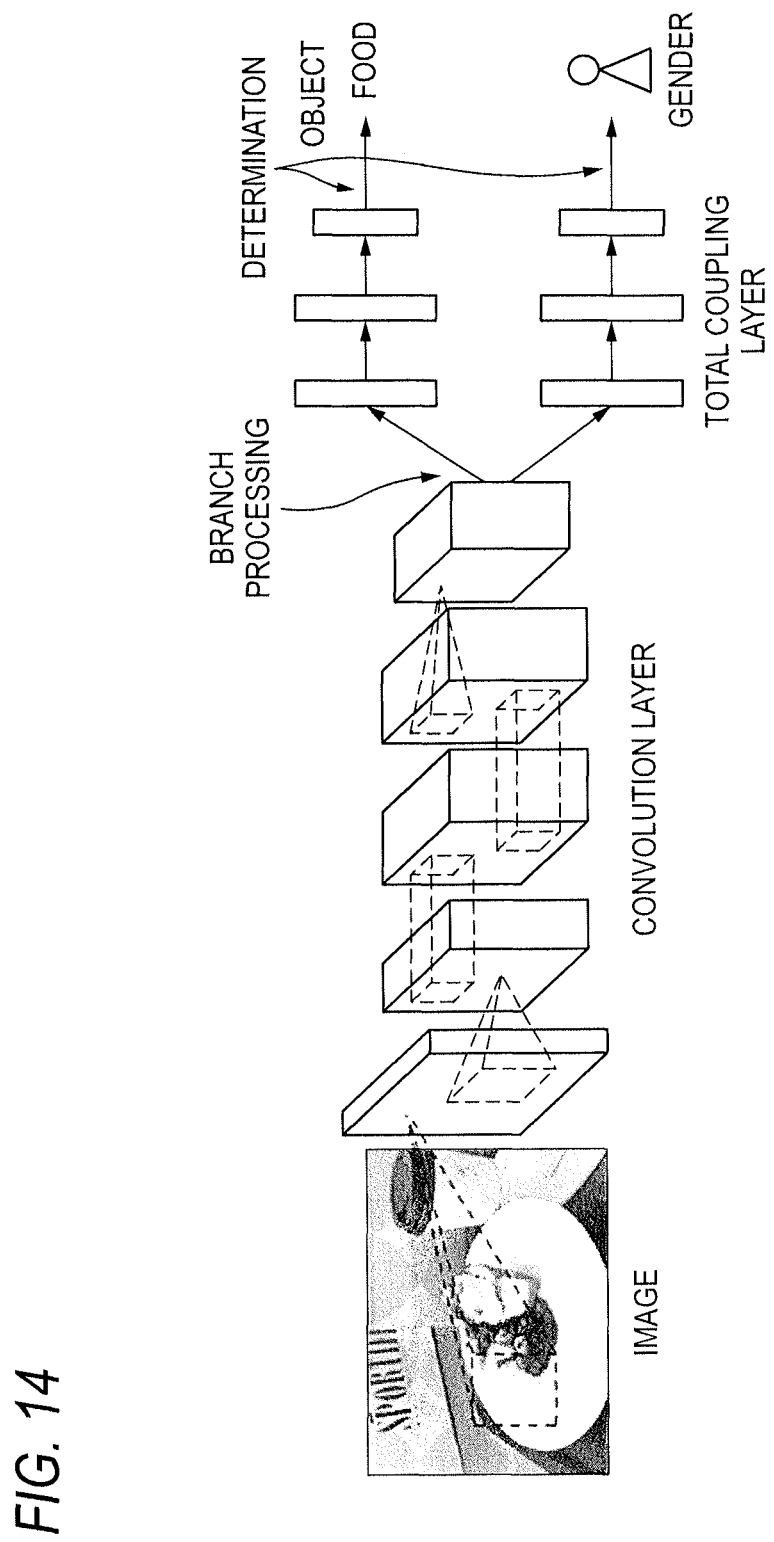
FIG. 14 is a schematic diagram illustrating a configuration of a neural network unit in Comparison Example. 2.

In the evaluation, as comparison examples, a case of performing the learning of only the gender label without performing the learning of the image content (Comparison Example 1) and a case of performing the learning without performing the coupling processing (Comparison Example 2: corresponding to the method disclosed in JP-A-2008-198078) are prepared. These two cases are compared using an F-measure which is a harmonic average of a precision rate and a recall rate. FIG. 13 illustrates a configuration of the neural network unit in the Comparison Example 1 and FIG. 14 illustrates a configuration of the neural network unit in the Comparison Example 2.

Figure 15:
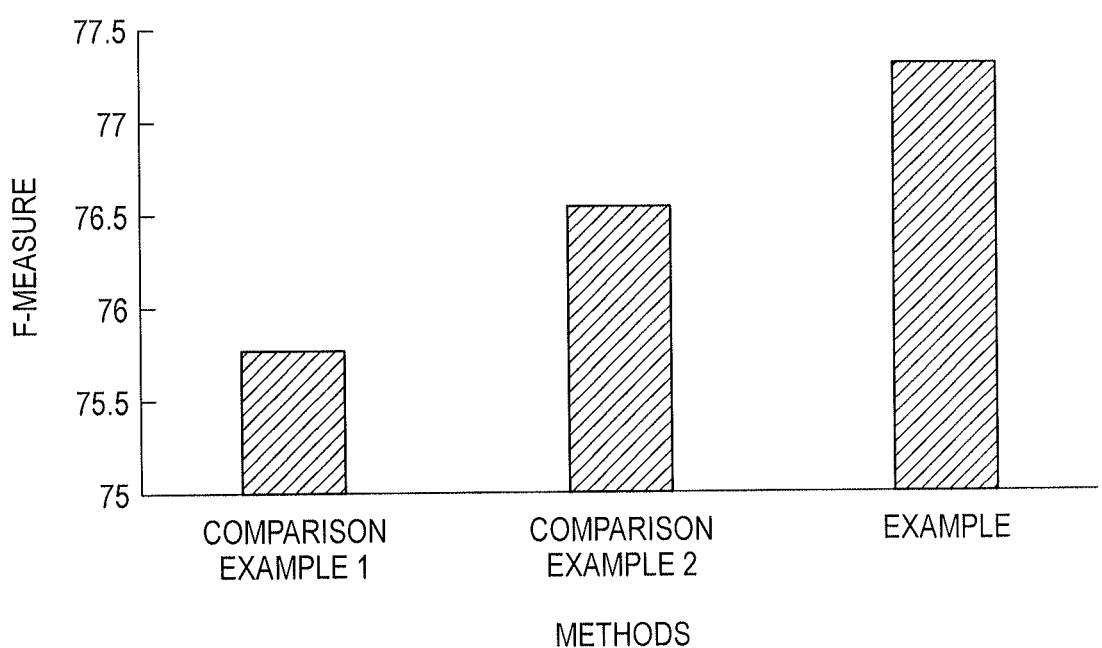
FIG. 15 is a graph illustrating a result of evaluation of the Example and each of the Comparison Examples.

The result is illustrated in FIG. 15. According to the comparison between the Comparison Example 1 and the Comparison Example 2, it can be understood that the estimation accuracy is high when the learning is performed using the image content information. In addition, it can be understood that the estimation accuracy becomes high in the Example in which the coupling of the two feature amounts of the main task and the sub-task is performed, compared to the Comparison Example 2 in which the coupling processing is not performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable recording medium storing a program that causes a computer to execute:
   receiving data;
   receiving supervision; and
   performing artificial neural network processing to determine a gender of a poster of an image from image content of the image, the image being read from the received data,
   wherein performing the artificial neural network processing includes
      processing a main task with a first sub-network including one or more layers, the main task corresponding to gender estimation, the first sub-network configured to extract a first feature amount which is a feature amount of the gender,
      processing a sub-task with a second sub-network including one or more layers, the sub-task corresponding to content recognition, the second sub-network configured to extract a second feature amount which is a feature amount of the image content, and performing processing not included in any of the main task and the sub-task with a third sub-network including one or more layers, the third sub-network not sharing a layer with any of the first sub-network and the second sub-network, the third sub-network configured to extract a third feature amount that is an output result from the image, wherein performing the processing not included in any of the main task and the sub-task includes outputting a value same as an input feature amount to a plurality of layers of the first sub-network and the second sub-network, and processing the main task includes coupling inputs from the plurality of layers of the first sub-network and the second sub-network and outputting a result, wherein the coupling includes coupling the feature amount of the gender and the feature amount of the image content by performing processing of concatenating the feature amount of the gender and the feature amount of the image content, or processing of calculating with respect to the plurality of layers of the first sub-network and the second sub-network for each element of the received feature amount of the gender and the received feature amount of the image content so as to integrate the feature amount of the gender and the feature amount of the image content, and outputting the result.

2. The non-transitory computer readable recording medium according to claim 1,
wherein a non-linear calculation is not applied in a final layer in the first sub-network and a final layer in the second sub-network, and a layer other than the final layer in the first sub-network and other than the final layer in the second sub-network is formed from any one of a total coupling layer that applies a linear calculation and the non-linear calculation, and a convolution layer that performs a convolution processing, the non-linear calculation, and a pooling processing.

3. The non-transitory computer readable recording medium according to claim 1,
wherein the program further causes the computer to execute
outputting a determination result of each task,
outputting an error between two types of inputs, and
executing an error back-propagation method based on a stochastic gradient descent.

4. The non-transitory computer readable recording medium according to claim 1, wherein
processing the main task further includes branching input errors in accordance with the processing of concatenating the inputs or the processing of calculating and outputting the result to the plurality of layers, and
performing the processing not included in any of the main task and the sub-task further includes integrating errors input from the plurality of layers.

5. The non-transitory computer readable recording medium according to claim 1,
wherein the program further causes the computer to execute a normalization processing.

\* \* \* \* \*